United States Patent [19]

Toivonen

[11] Patent Number: 6,058,134
[45] Date of Patent: May 2, 2000

[54] METHOD FOR MEASURING THE ELECTRIC QUANTITIES OF AN AC ELECTRIC-ARC FURNACE

[76] Inventor: Lassi Toivonen, Keihasrinne 22 E, 02610, Espoo, Finland

[21] Appl. No.: 08/596,693

[22] Filed: Feb. 5, 1996

Related U.S. Application Data

[63] Continuation of application No. 08/290,987, Aug. 23, 1994.

[30] Foreign Application Priority Data

Feb. 25, 1992 [FI] Finland ................................. 920820

[51] Int. Cl.$^7$ ................................................. H05B 7/148
[52] U.S. Cl. ........................................ 373/104; 323/210
[58] Field of Search ............................... 373/102–108; 323/210–215

[56] References Cited

U.S. PATENT DOCUMENTS

| | | | |
|---|---|---|---|
| 3,432,604 | 3/1969 | Harbaugh | 373/104 |
| 3,963,978 | 6/1976 | Kelley et al. | 323/102 |
| 3,989,999 | 11/1976 | Thompson et al. | 373/104 |
| 4,121,150 | 10/1978 | Kelley | 373/102 |
| 4,296,269 | 10/1981 | Stewart et al. | 373/104 |
| 4,320,245 | 3/1982 | Gaydon et al. | 373/104 |
| 4,580,272 | 4/1986 | Honkaniemi | 373/104 |
| 4,620,308 | 10/1986 | Persson et al. | 373/105 |
| 4,677,643 | 6/1987 | Dicks | 373/105 |
| 4,683,577 | 7/1987 | Bretthauer et al. | 373/105 |
| 4,698,824 | 10/1987 | Willners et al. | 373/104 |

FOREIGN PATENT DOCUMENTS

| | | |
|---|---|---|
| 64486 | 7/1983 | Finland . |
| 68918 | 7/1985 | Finland . |
| 2039756 | 2/1972 | Germany . |
| 3508323 | 9/1985 | Germany . |
| 77/3923 | 6/1977 | South Africa . |

OTHER PUBLICATIONS

"The Measurement of Electrical Variables in a Submerged–Arc Furnace," Report No. 2093, National Institute for Metallurgy, South Africa, Apr. 15, 1981.

Heinonen, P., Neuvo, Y., "FIR–Median Hybrid Filters," IEEE Transactions on Acoustics, Speech and Signal Processing, vol. ASSP–35, Jun. 1987, p. 832.

Shepherd, W., Zand, P., Energy flow and power factor in nonsinusoidal systems, London, New York, Melbourne: Cambridge University Press, 1979.

*Primary Examiner*—Tu Ba Hoang
*Attorney, Agent, or Firm*—Michael D. Bednarek; Crowell & Moring LLP

[57] ABSTRACT

This invention relates to a method for measuring the electrode-related electric quantities of an AC electric-arc furnace. The method is based on observing the mutual correlation between electrode currents and total power supplied into a furnace by utilizing the fast, natural fluctuation of currents and power supplies into a furnace, and on estimation observations. The information required in estimation is collected by performing a plurality of successive current and voltage measurements at adjacent instants and at various energy distributions of a furnace. The measurement results are used to calculably determine the estimates for electrode-related voltages, impedances and powers. It is further possible to split the electrode-related powers and voltages on the one hand in the electric-arc power and voltage and on the other hand in the power and voltage loss caused by resistive conduction. The effect of mutual impedances is automatically taken into account in estimation. If desired, the estimation can be performed independently at those frequencies, i.e., at the power system fundamental frequency and at harmonic and interharmonic frequencies which experience a significant transfer of energy. The method is useful in measuring both a furnace with neutral power connection and a furnace without neutral power connection. The measurements can be performed in the primary or secondary of the furnace transformer.

13 Claims, 2 Drawing Sheets

METHOD FOR MEASURING THE ELECTRIC QUANTITIES OF AN AC ELECTRIC-ARC FURNACE

This application is a continuation of application Ser. No. 08/290,987 filed Aug. 23, 1994.

FIELD OF THE INVENTION

BACKGROUND OF THE INVENTION

Reference is made to the following materials, the disclosures of which are hereby incorporated by reference herein:

[1] "The Measurement of Electrical Variables in a Submerged-Arc Furnace", Report No. 2093, National Institute for Metallurgy, South Africa, Apr. 15, 1981, 55 P.

[2] Patent publications ZA 77/3923 and ZA 78/0375 (Republic of South Africa).

[3] Heinonen, P., Neuvo, Y., "FIR-Median Hybrid Filters", IEEE Transactions on Acoustics, Speech and Signal Processing, vol. ASSP-35, June 1987, pp. 832–838.

[4] Shepherd, W., Zand, P., Energy flow and power factor in nonsinusoidal systems, London, New York, Melbourne: Cambridge University Press, 1979.

So-called electrode furnaces can be categorized as (1) resistance furnaces, wherein electrodes are submerged in molten metal, (2) submerged-arc furnaces, wherein electrodes are submerged in a non-melting material, e.g., slag, and which are used for the reduction of metals etc., e.g., ferrochromium furnaces, ferromanganese furnaces, calcium-carbide furnaces, and (3) open-arc furnaces, wherein electrodes are only occasionally in contact with a material to be melted, e.g., scrap melting furnaces. For the sake of simplicity, this description only deals with a three-phase AC electric-arc furnace, but all the described aspects can be readily extended to cover any desired polyphase electrode furnace.

The open-arc and submerged-arc furnaces most commonly employ a so-called knapsack connection in which each line voltage is connected between two working electrodes; the total number of electrodes is three. Thus, the system does not include a neutral power connection. The advantage of the connection arrangement is that the electrode current is $\sqrt{3}$ times the transformer secondary current. Since the electrode currents in a large-scale furnace exceed 100 kA, this represents a major advantage in transformer construction. Besides knapsack connected furnaces, this description deals with other AC electric-arc furnaces as well, including those with a neutral power connection.

The operation of several furnaces is inherently continuous: the furnace is charged and tapped while in operation. Erosion of the working electrodes is generally compensated for by adding blocks of self-baking carbon paste to the electrode tops and by slipping the electrode downwards according to its rate of erosion.

In order to optimize the operation of a furnace, the parameters of each working electrode must be adjusted individually. This is because the furnace does not operate in a homogeneous way: charging and tapping operations, for example, result in an uneven distribution of the charge. The adjustment operations include, e.g., manipulating the electrodes in the direction of the longitudinal axis, i.e., up and down, and adjusting the furnace transformer secondary voltages by the use of voltage tap changers. The purpose of the furnace control is to maximize the power factor and the active power delivered into the furnace and to eliminate the overload situations, such as surpassing the maximum current of the electrodes or the transformer secondary, and the apparent-power capacity of the transformer. On the other hand, another purpose of the control is to maintain an ideal reaction zone below the electrodes, which most often means that the same active power is supplied through all electrodes. Especially in high-capacity furnaces, the inductance of the furnace circuit in relation to the resistance is significant; as a result of this and the asymmetric state of the furnace, the relative active powers supplied by the electrodes may differ considerably from the ratios of electrode currents. Therefore, the measurement of the electrode-related active powers of the furnace is essential in view of the control. In a high-capacity furnace, there may occur a situation that the electrode-related reactance exceeds the corresponding resistance. Thus, increasing the current by reducing the resistance, i.e., by slipping the electrode, will reduce the active power supplied by the electrode. Therefore, it is very beneficial to know also the electrode-related resistances and reactances.

Since the arcing phenomenon occurring to a certain extent even in a submerged-arc furnace is not purely resistive but also includes a minor inductive component, the furnace active power in relation to the apparent power, i.e., the power factor, can be maximized by keeping the arcing phenomenon at its minimum and by maximizing the thermal power produced by resistive dissipation. The strength of arcing can be assessed, e.g., by measuring the amplitudes of distortion components of the electrode voltages. The distortion components of arc voltages can also be used for obtaining information about the operational phase of cyclically operating furnaces, e.g., scrap-mel ting furnaces.

The measuring information about power dissipated in the arc and the electrode-related active power or, on the other hand, the arc voltage, the electro de-related resistance and reactance are also utilized when predicting the erosion of electrodes. Even though prediction is used, the length of working electrodes must be periodically measured. The measurement can be most easily performed after stopping the furnace. However, many existing furnaces operate continuously and, thus, the length of electrodes can be readily measured only during operation halts. The fewer the opportunities of performing measurements, the more useful are the erosion models for prediction of the rate of the consumption of electrodes. For the above reasons, it is generally desirable either to measure the electrode-related distortion voltages or to measure directly the powers dissipated in the arc.

In the traditional measurement method, a measuring electrode, a so-called neutral connection, is placed in the carbon lining at the bottom of the furnace; this electrode is hopefully located at the real star point of the system. The furnace has no power return connection. The voltages per working electrode are measured relative to the neutral connection. There may even be three neutral connections, one for each working electrode. The furnace transformer secondary currents or electrode currents are measured by means of current transformers. If the furnace is in knapsack connection the current transformers of the furnace transformer may be wired in a delta-star arrangement so that the currents at the secondary are together directly proportional to the electrode currents.

The problems of the traditional measurement method include strong disturbances in voltage measurement and the fact that the process is not symmetrical, e.g., as a result of uneven charging, so that the neutral connection does not lie at the real star point of the system. The disturbance problem originates mainly from the electro-magnetic flux, caused by electrode and furnace currents and extending through a large loop formed by the measuring conductors. The considerable loop size results from the fact that the objects to be measured, the top portions of working electrodes and, on the other hand, the neutral connection(s), are separated from each other by a distance of several meters. The neutral connection can also be easily broken in the hot environment and replacement of the connection is very difficult if the breakage is inside the furnace shell. In view of disturbances, a measuring system provided with three neutral connections is a substantial improvement if the voltage measuring leads are routed in the best possible way.

In view of disturbances and reliability a substantially improved system has been developed on the basis of the assumption that proportions of the inductances of secondary circuits supplying a furnace are known and remain constant or at least are calculable and that the fluctuation of furnace power is primarily caused by the fluctuations of resistances. When applying this assumption, a furnace neutral connection is not required and, thus, the resistances of the secondary circuits can also be measured from the primary of the furnace transformer. However, besides resistance, the electric arc contains some inductance (due to the strong effect of temperature on the conductivity of gas plasma and to thermal time constants), and also the length and position of electrodes have an effect on electrode-related inductances, so the above assumption of the permanently constant or calculable proportion of inductances is not strictly valid. Neither does the method account for the strong non-linearity of a furnace (and the electric arc). This is probably the reason why the method has not been applied to measurement of the distortion components of electrode-related voltages and, thus, the estimation of power produced by the electric arc must be performed by using a measuring system provided with neutral connection(s) at the bottom of the furnace.

SUMMARY OF THE INVENTION

The presently described novel method requires neither a neutral connection at the bottom of the furnace nor assumptions of, e.g., electrode-related inductances. The method employs simple, direct measurements of either a furnace transformer primary or secondary; thus, the measurements can be carried out without worrying about disturbances. It is possible to perform the measurements separately at the power system fundamental frequency and at each of those harmonic and interharmonic frequencies which carry a significant amount of energy. (Especially the open-arc and submerged-arc furnaces are non-linear, which is why the waveforms of voltages and currents supplying them are significantly distorted; as a result of this, also distortion components carry energy into the furnace.) The results are accurate since, despite a somewhat asymmetrical process, no symmetry assumptions are made and since it is possible to model the furnace separately at each harmonic and interharmonic frequency. By virtue of this last-mentioned feature, it is possible to calculate the electrode-related impedances and voltages at various frequencies and these can be used for estimating the power produced by the electric arc and further the erosion of electrodes. On the other hand, the arc voltages and powers can also be measured directly. A novelty in the method is that, because of the easy measurements, it is possible to model even relatively rapidly varying electrode-related electric quantities and, if so desired, the virtual process star point may be determined separately at each frequency on the basis of the above-mentioned quantities, without process-related assumptions, such as symmetry or constant proportions of inductances. In these measurements, the effect of mutual impedances is automatically taken into account. (In this context, the mutual impedances refer to those impedances, through which a current passes from one electrode to another past the material in molten state at the bottom of a furnace.) Another novel feature is that the modeling makes use of the intensive and fast fluctuation of currents and power occurring naturally in a furnace. Even when using a furnace with neutral power connection, the quantities measured relative to the virtual star point are not necessarily the same as electrode-related quantities, since some of the current of each electrode travels directly to the other electrode, which, hence, is a result of the inter-electrode mutual impedance. Even in this case, the novel method can be applied for the estimation of electrode-related quantities. It should be noted that the virtual star point calculated as directed above differ from the real star point; the virtual star points are determined on the basis of electrode-related quantities and take into account also the effect of mutual impedances and, thus, in terms of measurement and control, they are more important than the real star point.

The method utilizes those strong and abrupt variations which continuously occur in the power of especially an open-arc and submerged-arc furnace and which result from the fluctuation of furnace impedances and arc voltages. If the furnace is not provided with neutral power connection, the variation of a single electrode-related voltage or power has an inevitable effect on the electric parameters of other electrodes as well. It should be noted that the electrodes of a furnace with even a neutral power connection have mutual impedance and that, due to the relatively high power and low voltage of the furnace, the furnace transformer cannot be regarded as a voltage source with zero internal impedance, and the impedance of a neutral power connection cannot be regarded as zero. Therefore, also in this case, a change occurring at one electrode has an effect on the voltages and currents supplying the other electrodes. By means of repeated measurements it is possible to estimate for a furnace separately a (virtual) resistive and reactive star point, i.e., the electrode-related resistances, reactances and arc voltages or, alternatively, these quantities at frequencies experiencing a significant transfer of power. It is also possible to determine the phase angle related instantaneous voltage at each phase angle of power system voltage waveform and it is further possible to use this in the modeling of a furnace. There are no physical factors that would necessarily set the resistive and reactive virtual star point of the furnace in exactly the same spot and, thus, the electrode-related resistance-reactance proportions of the furnace are not the same.

In the novel method, the electrode currents and the furnace transformer secondary voltages are measured either directly from the secondary or primary cr from an intermediate voltage and those are reduced to the secondary. For the purpose of estimation, the measured signals can be used for calculating either the powers and r.m.s. values or the spectra of powers and signals. The most essential objective is the determination of the electrode-related powers of a furnace. For this purpose, it is possible to calculate, e.g., the total apparent power $S_T$ supplied into a furnace through all phases at all frequencies or alternatively the active and reactive power $P_T$ and $Q_T$ which, together with the electrode-related currents and so-called equivalent impedances, fulfils the equation (throughout this specification the complex quantities are designated with boldface alphabetical symbols):

$$S_T = I_1^2 Z_{E1} + I_2^2 Z_{E2} + I_3^2 Z_{E3}, \quad (1)$$

or alternatively $$P_T = I_1^2 R_{E1} + I_2^2 R_{E2} + I_3^2 R_{E3} \quad (2a)$$

and $$Q_T = I_1^2 X_{E1} + I_2^2 X_{E2} + I_3^2 X_{E3}, \quad (2b)$$

wherein $Z_{E1} \ldots Z_{E3}$ are equivalent impedances representing electrodes $1 \ldots 3$, $R_{E1} \ldots R_{E3}$ and $X_{E1} \ldots X_{E3}$ are the real and imaginary components of these impedances, respectively, and $I_1 \ldots I_3$ are the absolute values of the currents of electrodes $1 \ldots 3$. The expressions are valid on the r.m.s. values of the currents and total powers, but also at each frequency separately. They provide the furnace with a linear model for obtaining the electrode-related impedances which can be used for calculating electrode-related powers and voltages at the measured current values; e.g. phase 1 holds: $S_1 = I_1^2 Z_{E1}$ and $U_1 = I_1 Z_{E1}$. Since expressions (1), (2a) and (2b) describe a non-linear furnace with a linear model, the equivalent impedances shown therein represent the physical impedances of a furnace quite inaccurately. In practice, however, the described procedure corresponds to the results obtained by using the available measuring methods.

Expressions (1), (2a) and (2b) include six unknowns, i.e., the real and imaginary components of three complex impedances. It is possible to find the estimates for these by assuming that the impedances and/or arc voltages include a quickly varying component, whose magnitude is not an object of interest and which adds to an interesting, slowly varying component: Successive measurements are performed with $S_T$ and currents varying and results obtained from each measurement are expressed each as an individual equation. Thereafter, the equations produced by successive measurements are processed as a group of equations or a matrix equation, which is solved using suitable methods. Other methods for determining the correlation between various quantities can also be used, it is possible, e.g., to monitor just the variations of currents and total power and to employ those as input data for estimation; another alternative approach could be an adaptive model for the furnace. An essential point is that the estimation is used in an effort for finding those electrode-related quantities: impedances, voltages or powers, which explain in the best possible way the currents measured at adjacent instants, yet in different situations, i.e., at various energy distributions of a furnace in relation to the total furnace power (instantaneous power or active and apparent power)

Since variations in the energy distribution of a furnace between two successive measurements can be very insignificant, the obtained solution may contain an error of nearly arbitrary magnitude, due to insufficient input information. Therefore, it is either necessary to make sure that sufficiently significant variations occur between successive measurements or it is necessary to use non-linear filtering for calculating an estimate from successive results obtained, e.g., as solutions of groups of equations. Linear filtering would not attenuate sufficiently a typically impulse-like appearing error in a case where there is no pre-selection of measurement information, based on the magnitude of the above variations. Non-linear filtering can be effected, e.g., by searching the obtained results for the medians of electrode-related quantities, in other words, by using a so-called standard median filter, which is described in publications dealing with digital signal processing and which calculates a new median for each new sample, in this case for a new measurement result. Another type of filter can also be used, e.g., a so-called hybrid median filter, which is a combination of a linear digital filter and a median filter. The most important advantage over a standard median filter is a lesser computational loading. Such methods of calculation are illustrated in FIG. 2.

The above-described method can be specified by taking into account the non-linearity of a furnace, i.e., by splitting the power loss of a furnace on the one hand in a component dissipated in impedances and, on the other hand, in a component dissipated in the electric arc, according to a technique known in the art. Since the voltage of a high-current electric arc is more or less independent of the current, it can be shown that the total power can be expressed as:

$$S_T = I_1^2 Z_1 + I_2^2 Z_2 + I_3^2 Z_3 + U_{A1} I_1^* + U_{A2} I_2^* + U_{A3} I_3^*; \quad (3)$$

or alternatively for the active and reactive power separately $$P_T = I_1^2 R_1 + I_2^2 R_2 + I_3^2 R_3 + U_{A1} I_1 \cos \phi_1 + U_{A2} I_2 \cos \phi_2 + U_{A3} I_3 \cos \phi_3 \quad (4a)$$

and $$Q_T = I_1^2 X_1 + I_2^2 X_2 + I_3^2 X_3 + U_{A1} I_1 \sin \phi_1 + U_{A2} I_2 \sin \phi_2 + U_{A3} I_3 \sin \phi_3, \quad (4b)$$

wherein $U_{A1} \ldots U_{A3}$ are the arc voltages representing electrodes $1 \ldots 3$; the phase angles between arc voltages and corresponding electrode currents are designated by symbols $\phi_1 \ldots \phi_3$. The asterisk superscript (*) has been used as the symbol of a complex conjugate. These expressions are valid separately at each frequency but do not apply for the r.m.s. values and the total power quantities. In expressions (3), (4a) and (4b), the powers used in impedances correspond to the electrode-related dissipations produced by resistive conduction. These expressions include 12 unknowns, $R_1 \ldots R_3$, $X_1 \ldots X_3$, $U_{A1} \cos \phi_1 \ldots U_{A3} \cos \phi_3$ and $U_{A1} \sin \phi_1 \ldots U_{A3} \sin \phi_3$, i.e., the complex quantities $Z_1 \ldots Z_3$ and $U_{A1} \ldots U_{A3}$ which are solved as described above. However, the required number of filters is higher than previously as the number of unknowns has also increased. The above method is approximate as it is based on the assumption that the entire electrode current passes through an electric arc, which in fact is quite true.

The above expressions can also be formulated for the r.m.s. values and total power quantities by assuming that the arc voltage is in phase with the electrode current, although this is not exactly true. In this way a computationally less demanding approximate solution is achieved since it is not necessary to solve the equations at all frequencies simultaneously, although it is certainly possible; in addition, the number of unknowns will be decreased:

$$P_T = I_1^2 R_1 + I_2^2 R_2 + I_3^2 R_3 + U_1 I_1 + U_2 I_2 + U_3 I_3 \quad (5a)$$

and $$Q_T = I_1^2 X_1 + I_2^2 X_2 + I_3^2 X_3 \quad (5b)$$

The electrode-related voltages relative to virtual star points can also be calculated in a way other than previously described. At each frequency f, the following applies:

$$S_T(f)=U_1(f)I_1^*(f)+U_2(f)I_2^*(f)+U_3(f)I_3^*(f), \quad (6)$$

or alternatively $$P_T(f)=U_1(f)I_1(f)\cos\Phi_1(f)+U_2(f)I_2(f)\cos\Phi_2(f)+U_3(f)I_3(f)\cos\Phi_3(f) \quad (7a)$$

and $$Q_T(f)=U_1(f)I_1(f)\sin\Phi_1(f)+U_2(f)I_2(f)\sin\Phi_2(f)+U_3(f)I_3(f)\sin\Phi_3(f), \quad (7b)$$

wherein $\Phi_1(f) \ldots \Phi_3(f)$ are phase angles between virtual star-point voltages and electrode currents at each frequency. The expressions include six unknowns, $U_1(f)\cos\Phi_1(f) \ldots U_3(f)\cos\Phi_3(f)$ and $U_1(f)\sin\Phi_1(f) \ldots U_3(f)\sin\Phi_3(f)$, i.e., the complex quantities $U_1(f) \ldots U_3(f)$. These expressions do not apply for the r.m.s. values and total powers of non-sinusoidal waveforms.

The method can also be used for estimating the instantaneous electrode voltages $u_1(t) \ldots u_3(t)$ separately at desired system voltage phase angles by using the instantaneous values of total power and currents. The following applies for the instantaneous power as a function of time t:

$$P_T(t)=u_1(t)i_1(t)+u_2(t)i_2(t)+u_3(t)i_3(t). \quad (8)$$

When the time variable t is replaced with a periodic angular variable a, which thus expresses the phase angle of system voltage and is always the same in all phases at the same instant of time, the previous expression will be as follows:

$$P_T(\alpha)=u_1(\alpha)i_1(\alpha)+u_2(\alpha)i_2(\alpha)+u_3(\alpha)i_3(\alpha). \quad (9)$$

In the same way as above, successive measurements are used to produce a group of equations or a matrix equation on the basis of the previous expression and at the desired phase angles α of the system voltage.

An electric-arc furnace is a non-linear and highly disruptive load, the current and power of which are fluctuating continuously and rapidly, so the necessary measurement information is obtained within a short period of time, in other words, a furnace quickly produces varying energy distributions resulting primarily from arc voltage and impedance fluctuations. However, the power transfers into an electric furnace primarily just at the fundamental frequency and at the lowest harmonic frequencies. Therefore, the electrode-related quantities can only be measured at these frequencies. The consistency of results obtained at a given frequency can be estimated by means of generally applied measuring techniques, e.g., by analyzing the distribution of results and by measuring the coherence function.

The measurements carried out as directed above need not be performed in the immediate vicinity of the furnace. They can take place in the secondary or primary of the furnace transformer. This description does not take into account dissipations in the bus bars between the furnace transformer and the furnace, the furnace connection (e.g., straight or knapsack connection), transformer losses, the wiring arrangement of the transformer, the state of transformer tap changers or other such factors. However, the dissipations of the wiring and the transformer can be measured or calculated at a high accuracy and, thus, can be taken into account in signal processing. Similarly, the effect of furnace connection and furnace transformer wiring arrangement can also be taken into account, if necessary. If measurements are carried out in the primary of the furnace transformer it is further necessary to know the positions of the transformer tap changers in order to be able to reduce the measurement results into the transformer secondary. It is also obvious for a skilled person that the measurements require a sufficient resolution and linearity in order to achieve a sufficient accuracy.

In any three-phase system, if desired, the phase voltages, currents and powers can be split in symmetrical components; the same applies also to the electrode-related voltages, currents and powers of an electric furnace.

In certain cases, the time required by the novel method for-collecting the measurement data may be too long in view of the furnace control. In this case, the performance may be significantly improved by using "hybrid" measurement, which appropriately takes advantage of the accuracy offered by the novel method and the speed provided by some other method, e.g., the so-called traditional measuring method. By virtue of performing the methods in parallel, the error of a high-speed method can be measured and compensated for, which in practice can be done in several different ways.

DESCRIPTION OF THE PREFERRED EMBODIMENT

Figure 1:
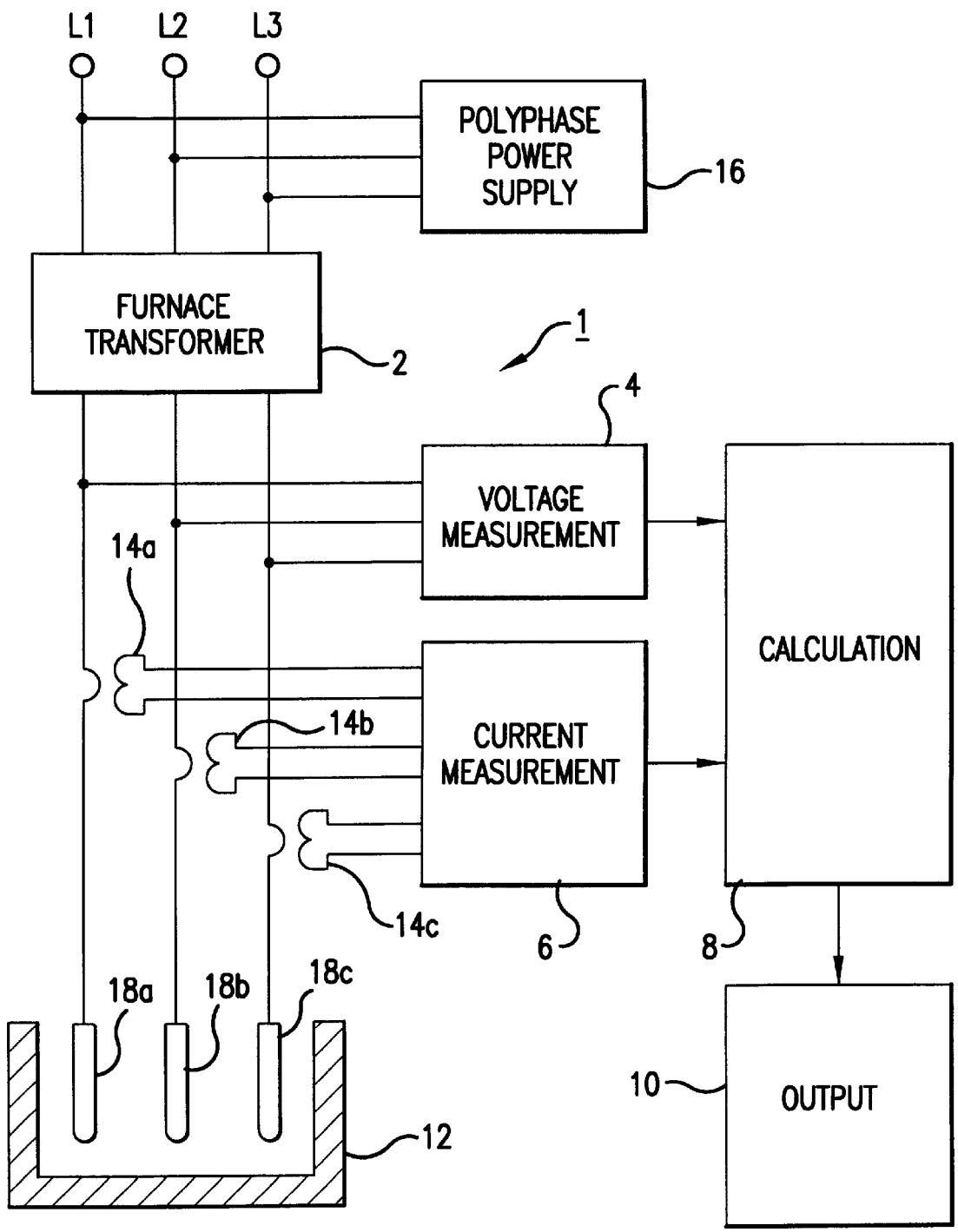
FIG. 1 is a block diagram of an embodiment of the present invention.
Figure 2:
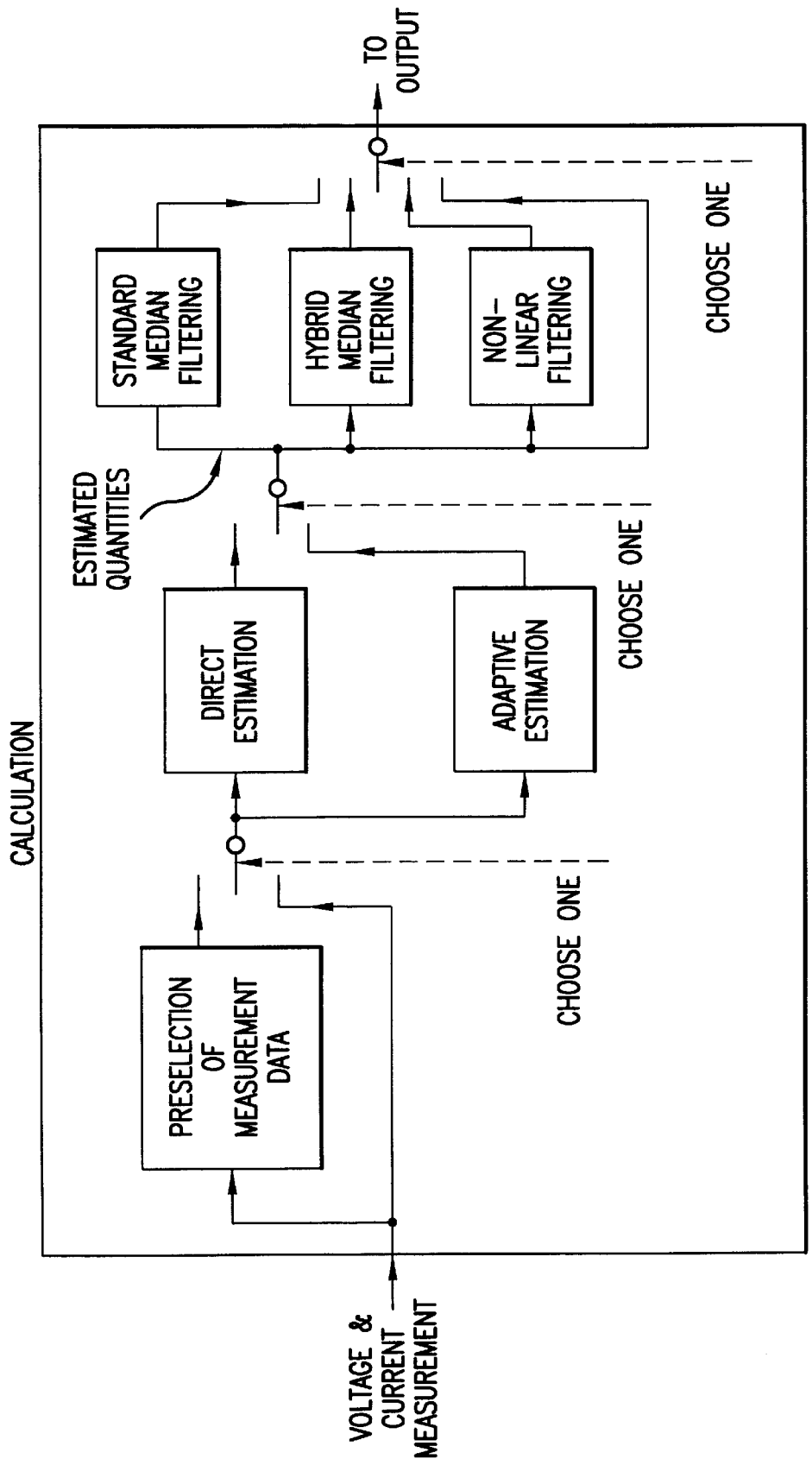
FIG. 2 is a block diagram illustrating a calculation step according to an embodiment of the present invention.

The accompanying drawing (FIG. 1) illustrates a block diagram of a wiring system 1 for carrying out the method of the invention. According to the embodiment shown, electrodes 18a, 18b, 18c are coupled to a polyphase power supply 16. The secondary currents of a furnace transformer which in this case are also electrode currents, are measured (see reference numeral 6) by means of current transformers 14a, 14b, 14c and the secondary signals of current transformers are sampled using a sufficient time and amplitude resolution. The voltages are measured as line voltages (see reference numeral 4), e.g., using resistive dividers (dividers not shown in drawing) and the divider output signals are sampled with resolution requirements matching those applied in the current measurement. In order to facilitate further processing, the voltages and currents of all phases are sampled simultaneously. The spectra are repeatedly calculated using the voltage and current samples as input data (see reference numeral 8). The spectra are used for calculating the total active and reactive power at each frequency, e.g., according to the following equation.

$$P_T(f)=U_{12}(f)I_1(f)\cos\beta_{12}(f)+U_{32}(f)I_3(f)\cos\beta_{32}(f) \quad (10a)$$

and $$Q_T(f)=U_{12}(f)I_1(f)\sin\beta_{12}(f)+U_{32}(f)I_3(f)\sin\beta_{32}(f), \quad (10b)$$

wherein, hence, $U_{12}(f)$ and $U_{32}(f)$ are the line voltages and $\beta_{12}(f)$ and $\beta_{32}(f)$ are the phase angles between $U_{12}(f)$ and $I_1(f)$ and, on the other and, $U_{32}(f)$ and $I_3(f)$ at various frequencies, respectively. Equations (10a) and (10b) apply accurately just to sinusoidal quantities, thus, e.g., to the various frequency components of a spectrum separately. Such calculated powers and measured currents are used for calculating impedances and arc voltages at each frequency, as pointed out above. The real and imaginary components of impedances at each frequency are separately applied to standard median filters, likewise $U_{A1} \cos \phi_1 \ldots U_{A3} \cos \phi_3$ and $U_{A1} \sin \phi_1 \ldots U_{A3} \sin \phi_3$ at each frequency separately. Thus, each frequency requires 12 filters, the result produced thereby being, e.g., a median of 100 or 1000 successive impedance values. The impedances and measured currents can be used for calculating, e.g., electrode-related voltages, currents and powers by means of generally known expressions and thereby providing an output 10.

The total power can be measured in many other ways as well: the instantaneous power can be calculated as a sum of correlations between voltages $u_{12}(t)$ and $u_{32}(t)$ and currents $i_1(t)$ and $i_3(t)$, i.e., $$P_T(t) = u_{112}(t)i_1(t) + u_{32}(t)i_3(t), \tag{11}$$

which produces the active power by low-pass filtering away the alternating component oscillating at a frequency twice that of the power supply voltage. (Since there are only samples available of these particular signals, the signals could be designated more accurately as $p_T(nT_s)$, $u_{12}(nT_s), \ldots$, wherein $T_s$ is the sampling interval and n is an integer index, $n \in [-\infty, \infty]$.) The filtering can be, e.g., an integrating operation (or, in terms of sampled data, rather a summing operation), the duration of which is equal to that of a system voltage cycle or its multiple, or a more generally applied low-pass filtering operation with properly selected edge frequencies for its pass and stop band. By using the r.m.s. values of voltages and currents, the apparent power will be:

$$S(t) = U_{12}(t)I_1(t) + U_{32}(t)I_3(t). \tag{12}$$

Here, the r.m.s. values are first calculated by low-pass filtering the squares of relevant time functions in a manner that a component oscillating at a frequency twice that of the power system fundamental frequency and, possibly, components having even higher frequencies are attenuated, followed by square rooting the filtered samples. For example, $I_1(t)$ is obtained by squaring the samples of $i_1(t)$, then by low-pass filtering the thus obtained $i^2_1(t)$ (or actually samples thereof), and by finally square rooting the filtered samples. From the instantaneous active and reactive power $p_T(t)$ and $q_T(t)$ are obtained $P_T(t)$ and $Q_T(t)$, which have comparable behaviour in frequency, by low-pass filtering them in the same way as $i_{12}(t)$ above. If desired, the active and apparent power can be used to calculate the reactive power in a conventional manner.

If desired, the reactive power can be s-lit in the "pure" reactive power and distortion power [4]. The pure reactive power refers to the type of reactive power produced as a correlation between the voltage and 90 degrees phase shifted current. The distortion power appears when the waveforms of voltage and current differ from each other. The following applies generally to apparent power, active, reactive and distortion power:

$$S^2 = P^2 + Q^2 + D^2. \tag{13}$$

The pure reactive power can be calculated either in a time or frequency domain, i.e., using the spectra of voltage and current as input data in the latter case. In the time domain, the pure reactive power is obtained by using the same correlation and filtering operations as those used for obtaining the active power, but by replacing the current with a signal that is produced by shifting the phase of current by 90 degrees. The phase shift can be performed in the time domain (simultaneously at all frequencies) by means of a Hilbert transformer, the practical realization of which has been described in text books and publications dealing with digital signal processing and which is preferably calculated as a convolution, thus corresponding to a calculation of a certain type of digital filter. Since the Hilbert transformation is a non-causal operation, the voltage samples must be delayed according to the delay caused by the Hilbert transformation. Thus, the following expression is obtained for the instantaneous, delayed reactive power:

$$q_T(t + T_0) = u_{12}(t + T_0)\mathcal{H}\{i_1(t)\} + u_{32}(t + T_0)\mathcal{H}\{i_3(t)\}, \tag{14}$$

wherein the Hilbert transformation is designated with the character $\mathcal{H}$ and he delay caused by the Transforming operation with $T_0$. The (reactive) distortion power can now be calculated using the total apparent power, active power and pure reactive power as input data.

In all above cases, the total power could also be measured using phase voltages and currents as input data; after all, the star point can be selected arbitrarily in a three-phase system without neutral power connection when measuring the total power.

What is claimed is:

1. In a polyphase arc discharge furnace having a plurality of electrodes disposed above or in a bath of conductive material, and a polyphase power system that includes a transformer system defining a primary circuit and a secondary circuit and an optional intermediate circuit, said transformer applying to each of the plurality of electrodes an alternating voltage which causes arc currents to flow between the plurality of electrodes and the bath, said transformer supplying power to the furnace through each of the plurality of electrodes, the total power being representative of power dissipated in the furnace, said arc currents flowing through impedances being representative of the electrode-related impedances, an optional neutral measurement connection comprising at least one electrode in the furnace bottom lining, a method for measuring electrical quantities of the polyphase arc discharge furnace, said method employing fast, natural fluctuation of currents and voltage supplied into a furnace, whereby the magnitude of the quick variation of currents is not an object of interest but adds to an interesting, slowly varying component, said method defining a virtual star point of the process, whereby it is unnecessary to utilize neutral measurement connections of the furnace nor to assume that the electrode-related inductances remain constant or calculable, said method comprising the steps of:

measuring at least one of (a) currents and voltages and (b) currents and power supplied to the furnace, at one of (a) primary circuit, (b) intermediate circuit, and (c) secondary circuit, at instants over a time interval during which currents through the plurality of electrodes and power supplied to the furnace undergo fluctuations, wherein measurements are made at at least one of a primary winding of the transformer, an intermediate portion of the transformer, and a secondary winding of the transformer;

generating sets of signals based on said measurements, each of the sets of signals being representative of the power supplied to the furnace and the currents through each of the plurality of electrodes at instants within said time interval; and determining an estimate of the electrical quantities of the furnace at predetermined frequencies by determining the relationship between the power dissipated in the furnace and the currents through the plurality of electrodes on the basis of said set of signals, said step of determining the estimates accounting for electrode-related quantities that relate to the power dissipated as a result of said arc currents.

2. A method as defined in claim 1, wherein said step of determining estimates of the electrical quantities of the furnace comprises:

expressing the power supplied to the furnace as a function of the currents through each of said plurality of electrodes;

constructing a group of equations based on said successive sets of signals obtained with said step of generating, each of said successive sets providing a corresponding equation within said group of equations; and solving unknown parameters in said group of equations to obtain estimates of the electrical quantities of the furnace which are based on said successive sets of signals.

3. A method as defined in claim 1, wherein said electrode-related quantities include at least one of: (I) electrode-specific power: (ii) electrode-specific voltage; iii) electrode-specific arc power; (iv) electrode-specific impedance; (vi) electrode-specific power dissipation in conduction phenomenon; (vii) electrode-specific voltage dissipation in conduction phenomenon; and (viii) electrode-specific voltage at a specific phase angle of power system voltage.

4. A method as defined in claim 1, wherein said relationship between the power supplied to the furnace and the currents through each of said plurality of electrodes is expressed as:

$$S = \sum_{n=1}^{N} Z_n I_n^2$$

wherein boldfaced letters represent complex quantities, N is a total number of said plurality of electrodes, $I_n$ is a magnitude of current $I_n$ through an electrode number n, $Z_n$ is an impedance specific to electrode n with n is from 1 to N, whereby the impedance of each $Z_n$ is used to calculate wherein a resulting estimated quantity for $Z_n$ is used to calculate at least a quantity of power specific to electrode n as $Z_n I_n^2$, and a voltage specific to electrode n as $I_n Z_n$.

5. A method as defined in claim 1 wherein the relationship between said power supplied to the furnace and said currents through said plurality of electrodes is expressed as:

$$S = \sum_{n=1}^{N} (Z_{Cn} I_n^2 + U_{an} I_n^*)$$

wherein boldfaced letters indicate complex quantities, S is said power supplied to the furnace, N is a total number of said electrodes, $I_n$ is said current through electrode n, $I_n$ is a magnitude of $I_n$, $Z_{Cn}$ is an impedance specific to electrode n with n is from 1 to N, $U_{An}$ is an arc voltage specific to electrode n with n is from 1 to N, and superscript * denotes a complex conjugate:

wherein the power supplied to the furnace is divided into two components in which one is dissipated in impedances $Z_{C1} \ldots Z_{CN}$, and another is dissipated in electric arcs specific to electrodes 1 . . . N; and wherein estimated quantities for $Z_{Cn}$ and $U_{An}$ are used to calculate at least the arc power specific to electrode n as $U_{An} I_n^*$, and the voltage specific to electrode n as $Z_{Cn} I_n + U_{An}$.

6. A method as defined in claim 1, wherein said predetermined frequencies include a fundamental frequency of said polyphase power sytem and harmonic and interharmonic frequencies which carry a significant amount of energy relative to other frequencies.

7. A method as defined in claim 1 wherein said step of determining estimates of the electrical quantities of the furnace is adaptive.

8. A method as defined in claim 1 wherein selected ones of the sets of signals obtained by said successive measurement sets are employed in said step of determining estimates of the electrical quantities of the furnace.

9. A method as defined in claim 1 wherein said electrical quantities obtained by said step of determining estimates of the electrical quantities of the furnace are further processed by least one of: (i) standard median filtering, (ii) hybrid median filtering, and (iii) non-linear filtering.

10. A method as defined in claim 1 wherein said step of determining estimates of the electrical quantities of the furnace is performed for at least one specific phase angle of power system voltage.

11. A method as defined in claim 1 wherein electrode-specific powers are divided into power components dissipated in a conduction phenomenon and in the electric arc.

12. A method as defined in claim 1 wherein only real components of currents through said electrodes and of said power dissipated in the furnace are utilized in said step of determining estimates of the electrical quantities of the furnace.

13. A method as defined in claim 1 wherein power dissipation of the transformer is taken into account when said power is determined.

* * * * *